United States Patent

[11] 3,625,460

[72] Inventors Per Borje Fonden
Hejdegatan 3;
Karl Ove Torgny Walander, Elsa Brandstrom gata 5, both of Linkoping, Sweden
[21] Appl. No. 3,767
[22] Filed Jan. 19, 1970
[45] Patented Dec. 7, 1971
[32] Priority Feb. 12, 1969
[33] Sweden
[31] 1895/69

[54] ARRESTING DEVICE FOR AIRCRAFT
4 Claims, 6 Drawing Figs.
[52] U.S. Cl. .................................................. 244/110 C
[51] Int. Cl. .................................................. B64f 1/02
[50] Field of Search .......................................... 244/110, 110 R, 110 C; 242/47.08, 47.09

[56] References Cited
UNITED STATES PATENTS
3,092,210 6/1963 Ronnerstrom ............... 244/110 A X
3,106,354 10/1963 Kitselman .................... 242/47.09
FOREIGN PATENTS
182,117 1/1963 Sweden ........................ 244/110

Primary Examiner—Trygve M. Blix
Assistant Examiner—Paul E. Sauberer
Attorney—Munson & Fiddler ABSTRACT: An arresting device for aircraft and which includes a band or cable connected to an arrestor, and which band or cable is stored in a magazine and is drawn therefrom during the arresting operation. The band engages a bollard that consists of at least two rotatable wheels or pulleys, at least one of the wheels or pulleys being coupled to a brake, the band pursuing a certain course in respect to the wheels or pulleys whereby during the arresting operation the band or cable is always drawn from an inner turn on one of the wheels, with the band leaving from that portion of said wheel which faces toward another of the wheels.

ARRESTING DEVICE FOR AIRCRAFT

Known types of arresting equipment for aircraft usually consist partly of some element, usually a cable or net, intended to bring the aircraft into communication with the equipment, and partly of a braking unit connected to the above-mentioned element, the latter often consisting of a brake at each side of the runway. There are also other arrangements. A feature of such arresting equipment is that such equipment must operate at relatively high speeds, and yet the loadings must be held down partly because of limitations in the aircraft structure. From the loading aspect, this has led to basically different designs. With one design, the aircraft must accelerate a drum of cable or band, connected to a rotating brake. As the length of the line or cable involved is some hundreds of meters, there is a large concentrated mass which must instantaneously be set in motion with the resulting problems of high loading. In another design, as much of the line or band as possible is stored in a stationary magazine, out of which the line is progressively accelerated to the operating speed, somewhat as takes place in a fishing reel.

In both of these arrangements, there are many variations. In one widely used design, employing a fixed magazine for the band or cable, the braking force is applied directly to the band or cable. There are several variants of this design. The braking force can also be applied to the cable by winding it a few times around a cylindrical bollard. Since with such an arrangement the cable cannot be applied to the bollard at the same place as it leaves it, it must of necessity pursue a spiral course around the bollard. The bollard can be so arranged that the cable will slip and will not move axially. However as this slip does not occur under controlled conditions, stability problems arise which are difficult to overcome.

One way of avoiding the above is described in Swedish Pat. No. 172140 where the cable is shown as being wound a few turns around two wheels, thereby eliminating the axial displacement of the cable. However, the weakness of this design is that it cannot be used with a band, as it requires excessive dimensions in the axial direction. Thus, the decisive advantage of small mass is lost.

The present invention solves this problem and is illustrated in the accompanying drawings in which FIG. 1 shows a bollard as seen from above;

Figure 1:
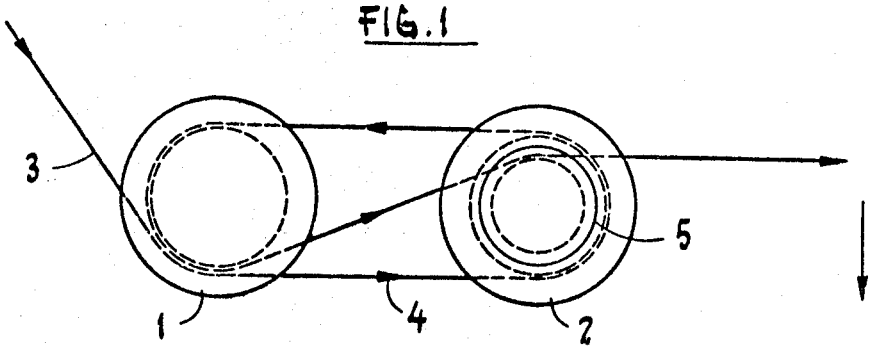

As shown in FIG. 1, the bollard consists of two parallel wheels or pulleys 1 and 2 suitably mounted on bearings. A band designated at 3 is fed to the wheel or pulley 1 from a band magazine of a known type. The outgoing end of the band is connected to an aircraft arresting device not shown. When an aircraft is arrested, the band is pulled out as shown by the arrows 4, from the magazine to the wheel or pulley 1 and therefrom to the wheel 2, from which the band returns to the wheel 1, passing inside of the band portion coming from the magazine and leaving the wheel 1 after about half a turn to be displaced in a parallel manner from the plane of the wheels 1, 2 to an idler wheel 5 mounted above and concentrically with the wheel 2, after which the band leaves the bollard.

Figure 2:
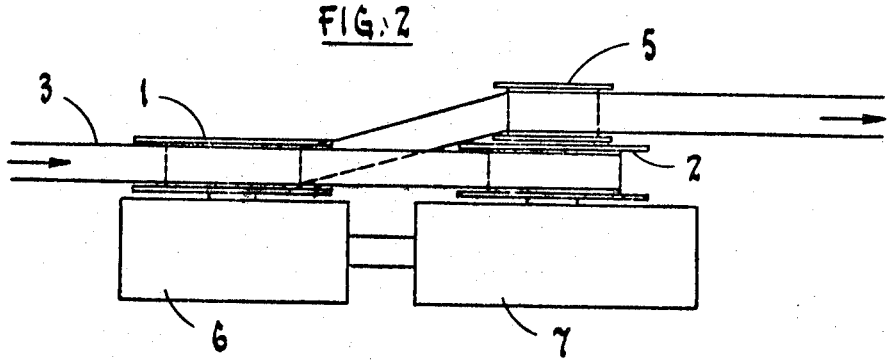
FIG. 2 shows the same bollard as seen from the side.

Brakes 6 and 7 (FIG. 2) of a known type are connected to the wheels 1 and 2 respectively. As will be later mentioned, these brakes can be of different kinds and can be connected to the respective wheels by gears, for example, thus permitting operation in any desired combination.

Figure 3:
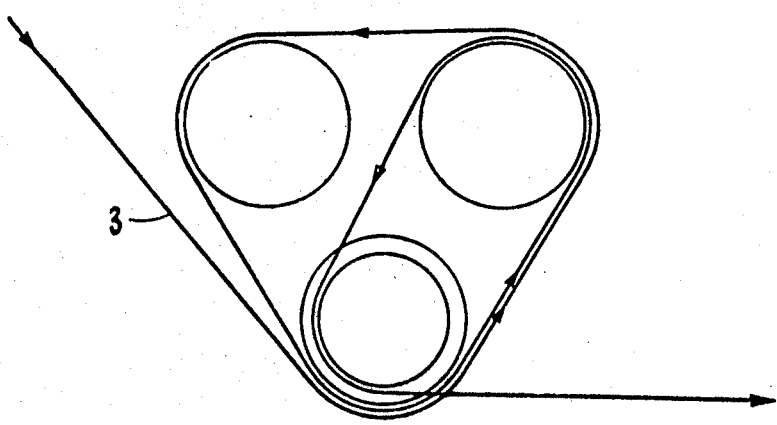
FIG. 3 shows a modified form of bollard as viewed from above.

In FIG. 3 it is shown how the band is laid around the wheels of a bollard that has three wheels or pulleys.

Figure 4:
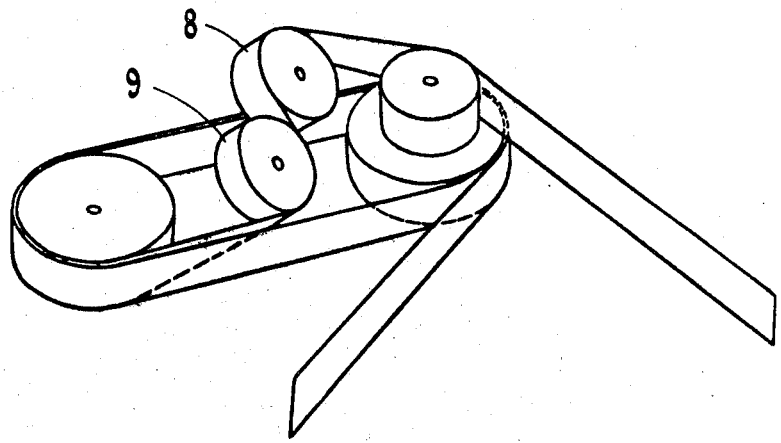
FIG. 4 shows an arrangement for the parallel displacement of the leaving band.
Figure 5:
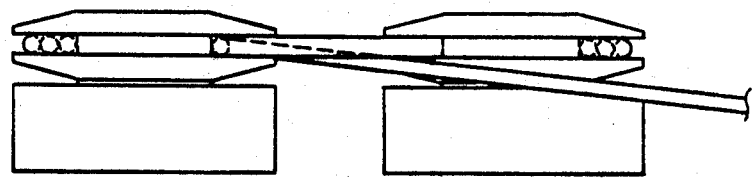
FIG. 5 shows a bollard intended for a cable and as viewed from the side.
Figure 6:
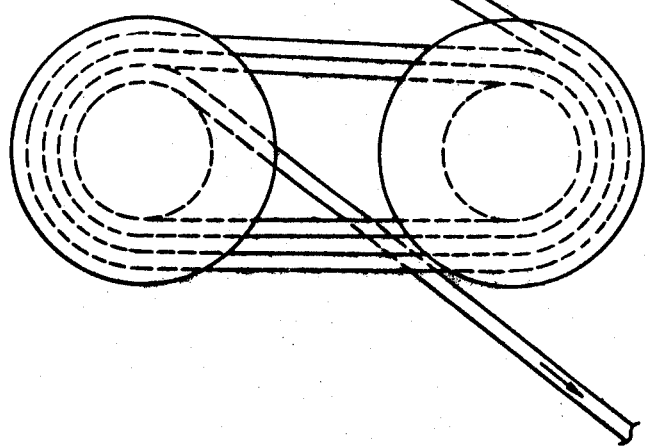
FIG. 6 shows the same bollard as viewed from above.

With the wheels mounted relatively close together, it may be difficult to displace the band in a parallel direction by bending it sideways. It can be made easier if the band traverses two angularly arranged wheels 8 and 9 that are located between the main wheels such as is shown in FIG. 4. FIGS. 5 and 6 show a bollard intended for use with a cable.

In the using of the term "band" herein it is to be understood that this can be defined as a flexible, tension-carrying element having the ability of being wound onto a radial coil without the underlying layers yielding or being wedged against the flanges of the wheels. A completely round cable with sufficient strength in the transverse direction can also be regarded as meeting the necessary requirement, if the flanges have sufficient stiffness.

The present invention includes such arrangements by which, upon suitable choice of material and construction, a cable is made to behave as a band. If the band is made sufficiently wide, the flanges mentioned above might possibly be eliminated.

An arrangement of this type has several further advantages. Among other things, it does not matter from which direction the incoming band proceeds, which means that the band can be fed from an annular magazine around the bollard and with only slight disadvantages, the bollard can accept very large fluctuations in the incoming side, as can be the case with a magazine carrying bands that are laid in a zigzag pattern.

Another advantage relates to the use of the bollard with fluid brakes for the necessary energy absorption. A characteristic of these brakes is that they produce a braking force which varies with the speed of rotation. Designs wherein a whole band storage drum is connected to the brake achieve a certain, usually sufficient, compensation in that the radius of the outgoing band decreases as the band is wound off, thus stepping up the speed and more or less maintaining the same braking effect. These designs however, still have the weakness that the whole mass of the band must be accelerated instantaneously.

The bollard herein described does not receive a corresponding speed compensation. However, by providing both bollards with a brake, one intended for operation at a lower speed of rotation and the other at a higher speed, the brakes and braking can be so arranged that the brake which operates at the higher speed is initially filled with liquid and the other one is empty, but during the braking sequence, the lower-speed brake is also gradually filled with fluid, thus providing speed compensation (braking compensated for falling speed of rotation). This time however, the important advantage is obtained of a small accelerated mass provided by the design comprising a bollard and magazine.

Several variations can provide the above advantage, that is the brakes could be identical but the two wheels around which the band runs could have different diameters, so that the speed of the brakes is different, or alternatively, various types of gears could be employed having different ratios for the two wheels. It could also be possible to have the same brake driven first by the one and then by the other wheel with different gear ratios between them. Another arrangement is one in which at least two of the wheels are provided with some means of coupling them to their own brake so that braking and inertia forces can be applied in combinations of either one or the other or both, or if more than two are fitted, the corresponding number of combinations.

What is claimed is:

1. Aircraft arresting device comprising:
   a. a band for carrying the stress applied to the end thereof as it is pulled from a place of storage under tension by the arrested aircraft;
   b. at least two rotatable wheels having rims for frictionally engaging said band,
   c. said wheels being spaced from one another in the direction of the generally longitudinal extension of said band;
   d. said band being pulled from the place of storage into engagement with one of said wheels over a predetermined arc thereof;
   e. thence into engagement with the second wheel;

f. thence back into engagement with the first wheel and beneath the portion of the band coming from the place of storage,
g. thence to an external point for connection to the aircraft and
h. brake means for controlling the rotational speed of said wheels.

2. Aircraft arresting device according to claim 1, in which the band engages an idler wheel upon being pulled from the first wheel.

3. Aircraft arresting device according to claim 2, in which the idler wheel is mounted coaxially with but on a plane different from that of the second wheel.

4. Aircraft arresting device according to claim 3, in which at least one additional idler wheel is provided for engaging the band between the first wheel and the first idler wheel.

* * * * *